United States Patent [19]
Hadano et al.

[11] Patent Number: 5,655,758
[45] Date of Patent: Aug. 12, 1997

[54] BUSHING FOR VEHICLE SUSPENSION

[75] Inventors: Katsuya Hadano, Kasugai; Tetsuya Tsuiki, Aichi-ken, both of Japan

[73] Assignee: Toyoda Gosei Co., Ltd., Aichi, Japan

[21] Appl. No.: 616,640

[22] Filed: Mar. 15, 1996

[30] Foreign Application Priority Data

Mar. 28, 1995 [JP] Japan .................. 7-096034
Mar. 30, 1995 [JP] Japan .................. 7-100170

[51] Int. Cl.⁶ .................................. F16F 1/38
[52] U.S. Cl. ..................... 267/141.7; 267/141.4; 267/281
[58] Field of Search .................. 267/141.1, 141.2, 267/141.3, 141.4, 141.5, 141.6, 141.7, 140.12, 153, 280, 289, 281

[56] References Cited

U.S. PATENT DOCUMENTS

| | | | |
|---|---|---|---|
| 2,353,943 | 7/1944 | Storch | 267/141.4 |
| 3,850,418 | 11/1974 | Hipsher et al. | 267/281 |
| 4,936,394 | 6/1990 | Ohtsu | 267/141.7 |

FOREIGN PATENT DOCUMENTS

6-8835   2/1994   Japan .
2033533   5/1980   United Kingdom .

*Primary Examiner*—Matthew C. Graham
*Attorney, Agent, or Firm*—Cushman Darby & Cushman IP Group of Pillsbury Madison & Sutro LLP

[57] ABSTRACT

A bushing for a vehicle suspension comprises an inner tube, an outer tube coaxially surrounding the inner tube, and a vibration isolating rubber filled between and integrally bonded to the inner and outer tubes. The inner tube has, on a part of its outer periphery, a hump portion projecting radially in a fan shape, which has an inclined surface. The outer tube has a tapered portion at one end, which is substantially identical in angle of inclination with the inclined surface of the inner tube hump portion and faces the inclined surface. A plurality of arcuate hollow portions are provided in the vibration isolating rubber to raise the compliance characteristic of the bushing in the longitudinal direction of the vehicle and thereby improve the riding comfort. Both the riding comfort and the steering stability are thereby improved.

6 Claims, 8 Drawing Sheets

BUSHING FOR VEHICLE SUSPENSION

FIELD OF THE INVENTION

The present invention relates to vibration isolating bushings for use in a vehicle suspension system, and more particularly to such bushings which exhibit a toe correcting function with respect to a cornering force, thereby enhancing both riding comfort and steering stability.

BACKGROUND OF THE INVENTION

In general, vibration isolating bushings for absorbing or damping vibration are provided in the mounting of a motor vehicle body where the suspension is attached. The vibration isolating bushing generally comprises an outer sleeve or tube, an inner sleeve or tube disposed concentrically with the outer tube, and a rubber-like resilient and elastic member interposed between the outer and inner tubes. The vibration isolating bushings, in order to give a good ride when the vehicle runs on a rough road, need to be made soft. On the other hand, in order to give good steering stability, it is necessary to make the bushings hard or stiff with respect to a lateral force, such as a cornering force. Some of the approaches for fulfilling the aforementioned conflicting needs are described below.

GB 2 033 533 A discloses a rubber-metal bearing for improving a tendency to over-steer during motor vehicle cornering. The bearing has rubber-metal interfaces, (i.e., the inner surface of an outer sleeve and the outer surface of an inner sleeve), at least partially oblique to the axis of the bearing, so that when an axial force is applied to the bearing, the outer and inner sleeves are displaced relative to each other radially along the oblique portions. They thereby produce a radial component-force to reduce or eliminate the over-steer tendency. GB 2033533 A further discloses, a bearing element having the oblique portions only at one end thereof, and teaches connecting two such bearing elements with the respective oblique portions oriented laterally outwardly, in order to make the bearing effective for forces in both axial directions.

Japanese Utility Model Application Laid-Open No. 6-8835 discloses a bushing for use in the link mechanism mounting portion of a suspension. The bushing is constructed so as to have a soft or small spring constant in the longitudinal direction of a motor vehicle and a hard or large spring constant in the lateral, or right and left, direction of the vehicle. More specifically, in this bushing, a bulged hump portion with an inclined surface is formed on an inner tube. An outer tube has a contracted portion at its end comprising a tapered surface opposed to the inclined surface of the inner tube. A rubber-like elastic member is interposed between the inclined surface of the inner tube and the tapered surface of the outer tube. The inclined surface and the tapered surface are paired with each other in the axial direction to thereby produce a radial component from an axial left or right load (input) acting on the bushing. By providing the bushing in the mounting portion of a suspension arm, a soft spring characteristic is provided in the longitudinal direction. Rigidity is high, however, in the right and left or lateral direction, with respect to vibration or load which is input from the road through the vehicle wheels. It is thus possible to satisfy both riding comfort and steering stability requirements.

GB 2 033 533 A, as having described above, teaches connecting two bearing elements so as to provide the oblique portions at respective ends of the connected elements, in order to deal with inputs in both axial directions. Also, in Japanese Utility Model Application Laid-Open No. 6-8835, two component-force generating means, each comprising the paired inclined surface and tapered surface, are provided in the axial direction in a single bushing. In either case, if the rigidity in the axial direction is increased to improve the steering stability, then the spring constant in the longitudinal direction of the vehicle, i.e., in the radial direction of the bushing, will also increase. As a result, the compliance characteristic of the suspension arm in the longitudinal direction, on which the bushing is mounted, is reduced, thereby reducing riding comfort. In addition, the structure of the bushing itself becomes complicated and the manufacturing cost is increased.

SUMMARY OF THE INVENTION

The present invention has, as an objective, providing a bushing for a suspension system which is capable of achieving both good steering stability and good riding comfort, has a simple structure, and is inexpensive.

To achieve this end, a bushing according to an aspect of the present invention comprises an inner tube having a radially extending hump portion on a part of an outer periphery thereof, an outer tube coaxially surrounding the inner tube, and a vibration isolating element made from a resilient elastic material, such as rubber, provided between the inner and outer tubes and integrally bonded to the inner and outer tubes, respectively. The hump portion projects in a radial direction of the inner tube into a fan shape and has an inclined surface at one end extending in an axial direction of the inner tube. The outer tube is provided with a tapered portion at one end. The tapered portion has an inner surface which opposes the inclined surface of the inner tube in a substantially parallel relationship. In one embodiment of the present invention, the bushing is further provided with a generally disk-shaped stopper having an inclined flange, and with a cushion element made from a resilient elastic material. The stopper is connected to the inner tube with the inclined flange being opposed to an outer surface of the tapered portion of the outer tube, in a substantially parallel relationship. The cushion element of the resilient elastic material is fixedly fitted to either the outer surface of the tapered portion of the outer tube, or the flange of the stopper facing the outer surface. The cushion element opposes the inclined surface of the inner tube with the tapered portion of the outer tube interposed therebetween.

A pair of bushings constructed in this manner are attached to the left and right suspensions of a vehicle, (particularly, to the rear suspension system), symmetrical with each other, with the respective stoppers oriented laterally outwardly. When the vehicle makes a turn, cornering forces act on the left and right wheels of the vehicle, respectively. In the rear suspension system to which the present invention is applied, the cornering force is transmitted through the link mechanism to each bushing and serves as a lateral force that acts in an axial direction of the bushing. As this occurs, a radial component force is produced in each bushing by the interaction of the hump portion of the inner tube and the tapered portion of the outer tube, between which is interposed the vibration isolating element, or by the interaction of the tapered portion of the outer tube and the inclined flange of the stopper, with the cushion element therebetween. With these component forces, the wheels are roll-steered to a toe-in side, thereby keeping the entire vehicle in an under-steer state. As a result, riding comfort can be improved because the spring constant of the bushing is made soft. In addition, steering stability is enhanced by the action of the bushing. That is, both riding comfort and steering stability can be improved. Further, by using the stopper, the deformation of each bushing in the left and right direction of the vehicle can be made substantially equal. The durability of the bushing is thus enhanced.

The vibration isolating element is preferably formed with a plurality of hollow portions. It is preferable that the hollow portions are spaced from one another along a circumferential direction of the bushing, and that each hollow portion, when viewed in an axial direction of the bushing, is in the form of an arc, along an inner circumference of the outer tube.

The bushing, when mounted with such hollow portions oriented in the longitudinal direction of the vehicle, has a reduced spring constant in the longitudinal direction. Accordingly, the compliance characteristic in the longitudinal direction increases. It is therefore possible to further enhance riding comfort where the vehicle runs over small bumps or jogs of the road. That is, both riding comfort and steering stability are further improved by formation of the hollow portions.

Preferably, at least two such hollow portion are provided symmetrically within the inner tube. It is preferable that the position of the hump portion of the inner tube with respect to a circumferential direction of the bushing is substantially aligned with one of the two hollow portions.

The outer tube may be elliptical in cross section. In this case, it is preferable that the position of the hump portion with respect to the circumferential direction of the bushing is substantially in line with a direction of the major axis of the elliptical outer tube cross section.

The cushion element may have a surface portion which faces the outer surface of the tapered portion of the outer tube and the flange of the stopper, and a plurality of grooves formed in the surface portion. In such a case, it is preferable that the grooves each extend in a circumferential direction of the stopper.

Such grooves smoothly change the effect of the stopper, depending upon the application of a thrust force to the bushing. With this, variation in the roll steer during cornering can be reduced, thereby further improving the steering stability.

According to another aspect of the invention, a bushing for a vehicle suspension comprises an inner tube having a hump portion on a part of an outer periphery thereof, an outer tube coaxially surrounding the inner tube, and a resilient vibration isolating element provided between the inner and outer tubes. The hump portion projects in a radial direction of the inner tube in a generally fan shape configuration. The hump portion has an inclined surface at one side, extending in an axial direction of the inner tube. The outer tube is, for example, elliptical in cross section and is formed with a tapered portion at its end in an axial direction of the outer tube. The tapered portion is opposed to the inclined surface of the inner tube in a substantially parallel relationship. The position of the hump portion of the inner tube with respect to a circumferential direction of the bushing is substantially aligned with the major axis of the outer tube cross section. The vibration isolating element is integrally bonded to the inner and outer tubes and is formed with at least two hollow portions which are, for example, arcuate. The hollow portions are positioned symmetrically with respect to the inner tube so that positions of the hollow portions with respect to the circumferential direction of the bushing are substantially in line with the major axis of the outer tube cross section.

The bushing according to the second aspect of the invention is intended to be mounted on a vehicle so that the major axis of the outer tube is oriented in the longitudinal direction of the vehicle. This bushing operates in the same way as the bushing according to the first aspect of the invention, except for the operation of the stopper, and has similar advantages. Furthermore, since the outer tube is elliptical, between the inner tube and the major axis side of the outer tube, the volume of the vibration isolating element at that location is larger than at the other portions. In addition, the arcuate hollow portions are also substantially in line with the major axis sides of the outer tube. For this reason, the spring constant in the longitudinal direction of the vehicle becomes smaller, and consequently, the compliance characteristic becomes high and further improvement in riding comfort when the vehicle runs over small bumps or jogs of the road. Moreover, because the inclined surface of the hump portion of the inner tube is substantially aligned with the major axis sides of the outer tube, a large part of vibration isolating element can be put in the area which is subjected to the thrust force acting on the bushing, i.e., between the hump portion of the inner tube and the tapered portion of the outer tube. As a result, in this area, when a thrust force is applied in the direction of tension, a radial component resulting from the thrust force will occur linearly, in the same manner as is in the case with a thrust force in the direction of compression. Therefore, the moments that tend to move the wheels to the toe-in side against the cornering force will occur equally in the left and right wheels. That is, the toe correcting effect on the wheels by the bushings is generally linear.

BRIEF DESCRIPTION OF DRAWINGS

The above and other features and advantages of the invention will become apparent from the following description of preferred embodiments of the invention taken in conjunction with accompanying drawings in which.

DESCRIPTION OF THE PREFERRED EMBODIMENTS

A preferred embodiment of the present invention will hereinafter be described based on FIGS. 1 to 9. The structure of this embodiment, as shown in FIG. 1, basically comprises a pipe-shaped inner tube 1, an outer, generally cylindrical tube 3 having a tapered surface 31 at its one end, a vibration isolating element 2 made from a rubber-like elastic material provided between the inner and outer tubes 1 and 3, a disk-shaped stopper 5 which is connected to the inner tube 1 and has a tapered flange 51 so formed as to be paired with the taper surface 31 of the outer tube 3, and a cushion 6 provided on one of the inner surface of the tapered flange 51 or the tapered surface 31.

Figure 2:
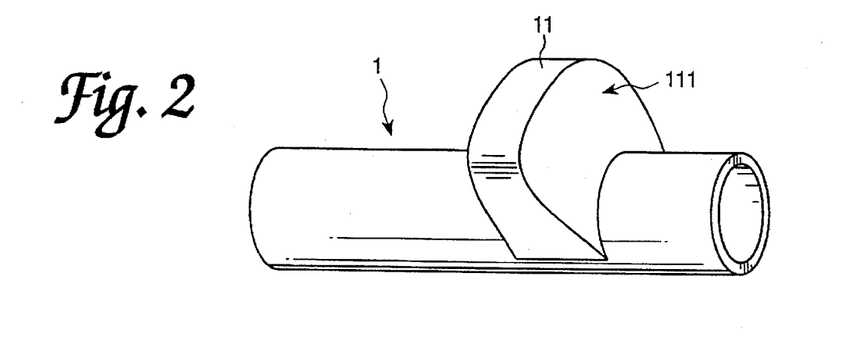
FIG. 2 is a perspective view showing an inner tube of the bushing of FIG. 1.
Figure 3:
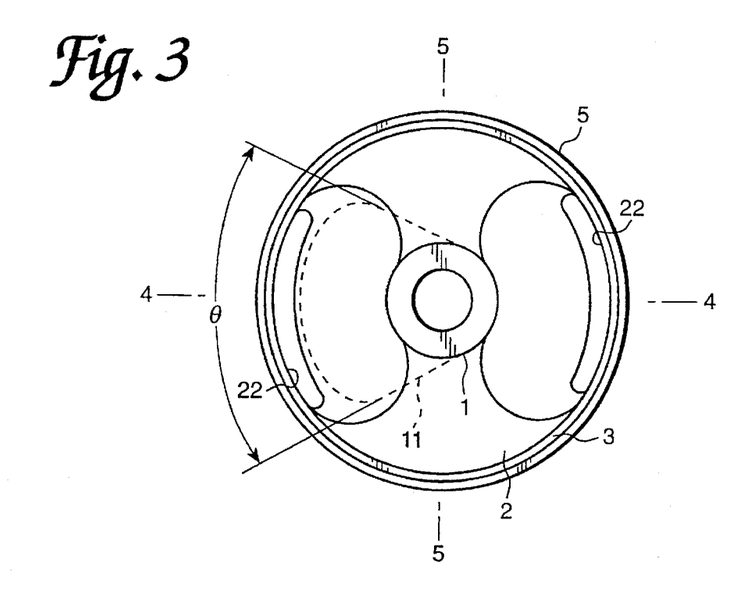
FIG. 3 is an end view showing the inner tube, an outer tube, and a vibration isolating element of the bushing of FIG. 1.

In this structure, the inner tube 1 is basically a hollow, generally straight pipe. On a part of the outer peripheral surface of inner tube 1 a hump portion 11 is provided, comprising a bulged portion, such as is shown in FIG. 2. The hump portion 11 has a radially extending fan shape on the outer periphery of the inner tube 1, as shown in FIGS. 2 and 3. The spreading angle θ of the fan shape is between about 100° to 120°. On one side of the bulged portion forming the hump portion 11, an inclined surface 111 is provided having an angle of inclination of about 45° to 55° (see FIG. 4a). The inclined surface 111, as shown in FIG. 4a, opposes the interior of the tapered surface 31 of the outer tube 3, when the bushing is assembled.

Figure 1:
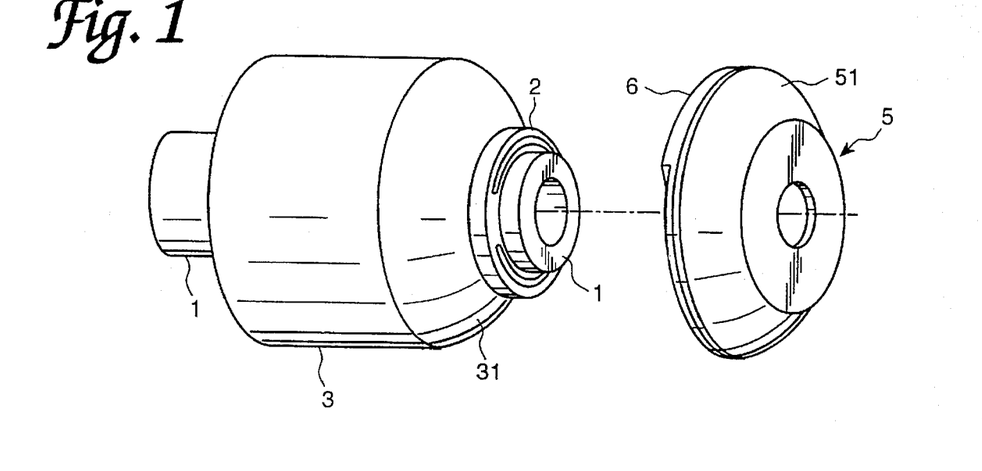
FIG. 1 is an exploded perspective view showing the overall structure of a vibration isolating bushing according to an embodiment of the present invention.
Figure 4A:
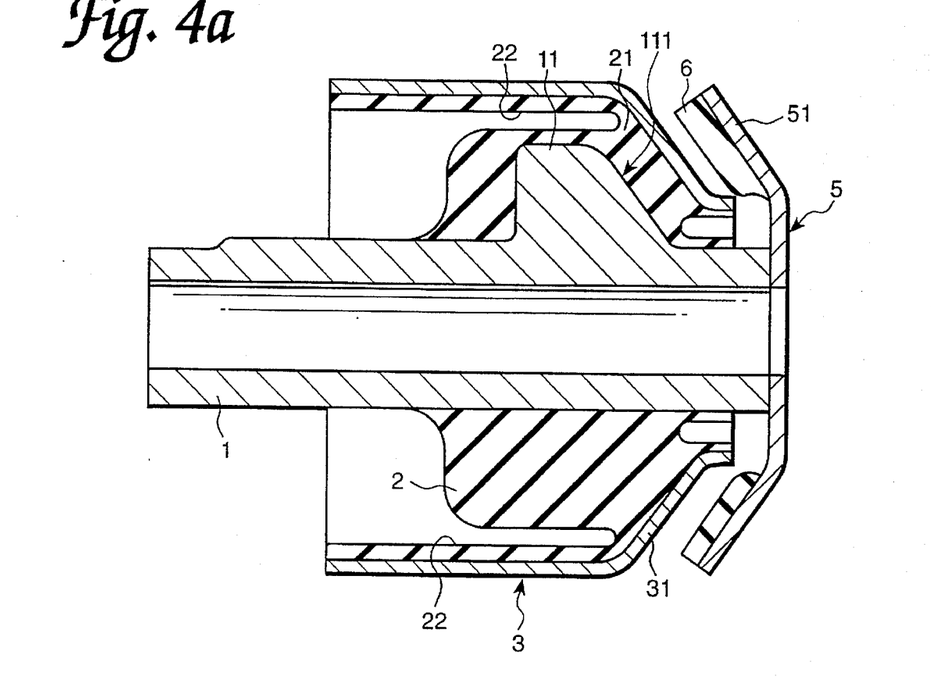
FIG. 4a and 4b are sectional views taken along line 4—4 of FIG. 3.
Figure 5:
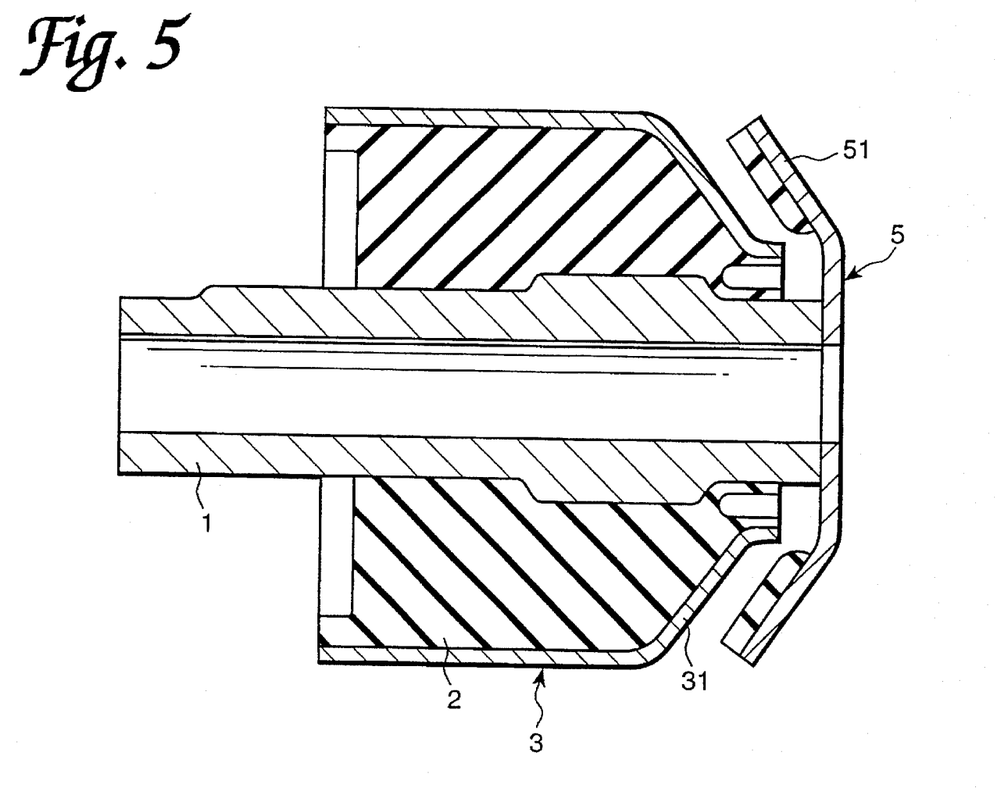
FIG. 5 is a sectional view taken along line 5—5 of FIG. 3.

The outer tube 3, which is disposed outside of the inner tube 1, (as shown in FIGS. 1, 3, and 4a), is basically a cylindrical shape. On one side thereof a tapered surface 31 is provided having substantially the same solid angle as that of the inclined surface 111. Provided between these inner and outer tubes is the vibration isolating element 2 comprising a resiliently elastic material, such as natural rubber, EPR (ethylene-ptopylene rubber), a blend of natural rubber and synthetic rubber, e.g. SBR (styrene-butadiene rubber) or BR (butadiene rubber), or the like, as shown in FIGS. 3 to 5.

Figure 6:
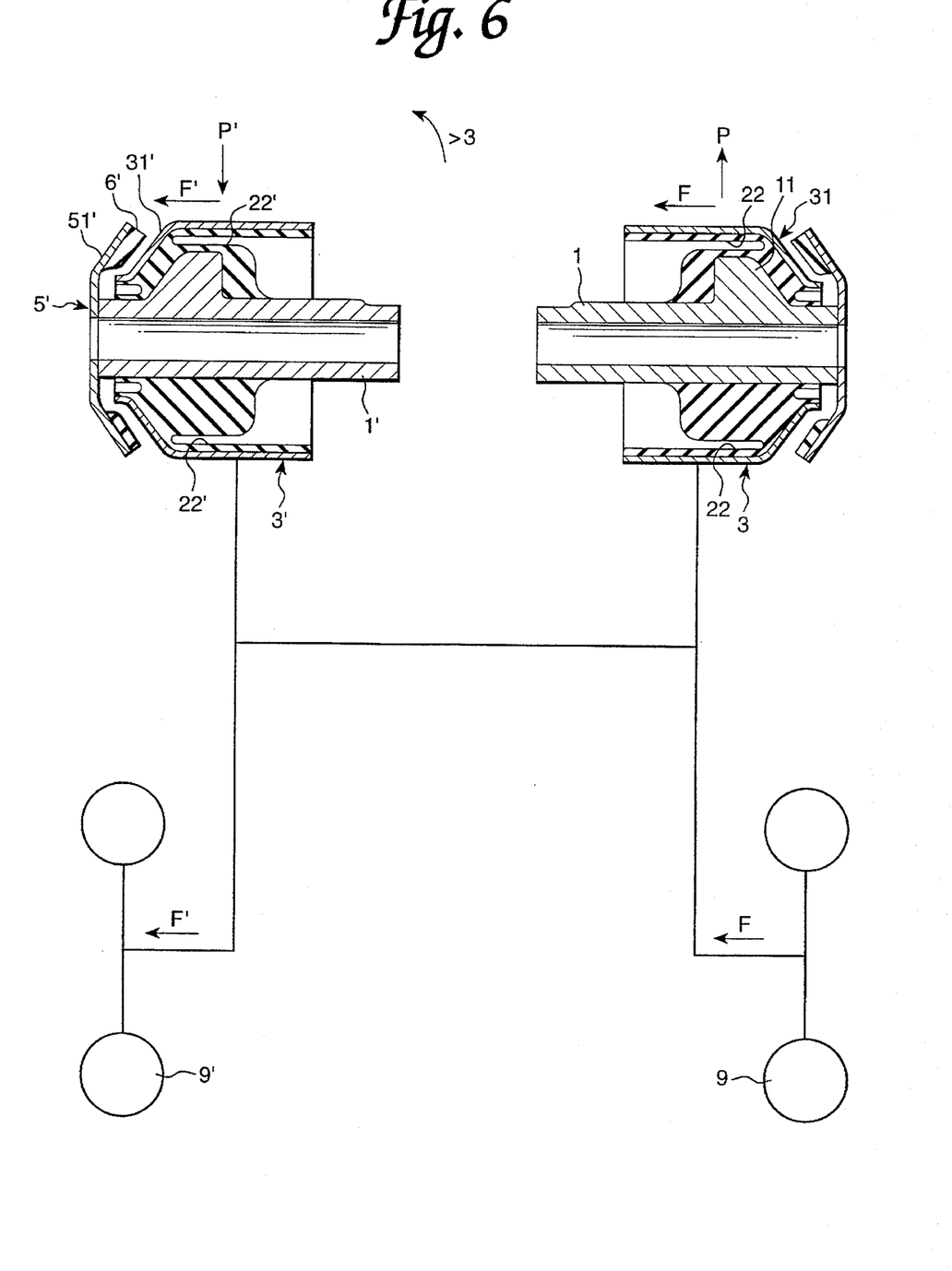
FIG. 6 is a schematic view of a rear suspension mechanism showing the bushing of FIG. 1 as mounted.

The vibration isolating element 2 is, for example, injected between the inner and outer tubes 1, 3 by a known injection process and is formed integrally with the inner and outer tubes 1 and 3 by a vulcanizing adhesion process. The vibration isolating element 2 has, for example, two arcuate cavity portions 22 which are generally symmetrical with each other as shown in FIGS. 3 and 4a. It is preferable that the positions of these cavity portions 22 are on line 4—4 in FIG. 3. The 4—4 direction is aligned with the front-and-rear, or longitudinal, direction of a vehicle when the bushing is assembled in a suspension mechanism of the vehicle, as shown in FIG. 6. In the section of the bushing along line 5—5, the cavity portions 22 are absent, and the vibration isolating element 2 is substantially solid there. Line 5—5 is oriented in the up-and-down direction when the bushing is assembled in the suspension mechanism of the vehicle. Between the inclined surface 111 of the hump portion 11 of the inner tube 1 and the tapered surface 31 of the outer tube 3, the vibration isolating element 2 is, for example, injected, thereby forming an inclined or contracted portion 21.

The disk-shaped stopper 5, which is generally in the form of an umbrella, is provided outside the tapered surface 31 of the outer tube 3, as shown in FIGS. 1, 3, 4a, and 5. The stopper 5 has a tapered flange 51 at its periphery, which has substantially the same taper angle as that of the tapered surface 31 of the outer tube 3. On the inner surface of the tapered flange 51, a cushion 6 made from a resilient elastic material, such as natural rubber, EPR (ethylene-ptopylene rubber), a blend of natural rubber and synthetic rubber, e.g. SBR (styrene-butadiene rubber) or BR (butadiene rubber), or the like, which extends along at least a part of the circumference thereof. The circumferential angle at which the cushion 6 is provided is between about 100° to 120°, as with the circumferential angle of the hump portion 11.

The inner tube 1, the outer tube 3, and the vibration isolating element 2 are united when the vibration isolating element 2 is vulcanized and adhered. Adjacent to the side surface of united body, the stopper 5 is integrally connected to the inner tube 1 at the end face thereof. When the stopper 5 is integrally assembled with the inner tube 1, the inclined surface 111 is opposite to the cushion 6 provided on the tapered flange 51 of the stopper 5.

Figure 4B:
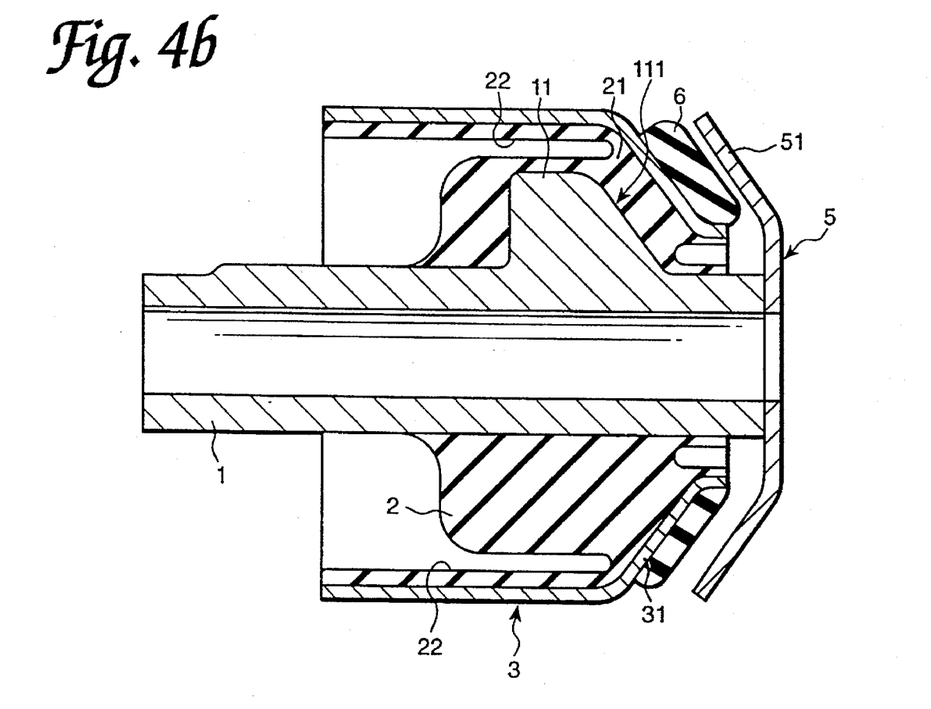
Figure 9:
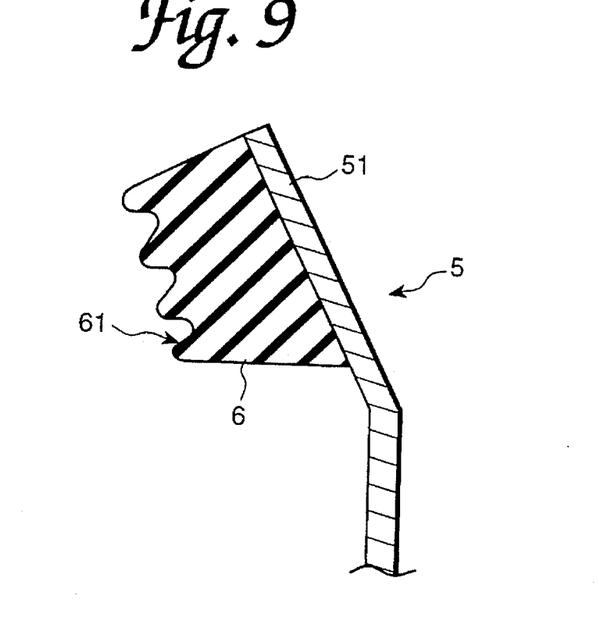
FIG. 9 is a partial sectional view showing a modification of the bushing of FIG. 1.

The cushion 6, which is, for example, provided on the inner surface of the tapered flange 51, is integrally fitted to the tapered flange 51 by vulcanizing. As described above, the cushion 6, instead of being provided on the side of the tapered flange 51, may be alternatively provided on the outer side of the tapered surface 31 of the outer tube 3 as shown in FIG. 4b. The resilient material is thus concentrated on the sides of the outer tube 3 in this case, and the stopper 5 itself becomes a structure without a cushion portion, thereby simplifying the structure of the stopper 5. In addition, grooves 61, as shown in FIG. 9, may be provided on the inner surface of the cushion 6 which contacts the tapered surface 31 tube 3. When the tapered surface 31 and the cushion 6 are contact each other and are deformed or displaced by interaction, (i.e., transfer of force), movement and deformation or deflection of a load can be performed smoothly by providing grooves 61. That is, in the load-deflection graph of FIG. 7, the curve in the vicinity of a transformation point, indicated by letter A, at which the operation of the stopper comes into effect can be smoothly changed.

The bushing constructed as described above, is attached to a link mechanism of the suspension system that the cavity portions 22 of the vibration isolating rubber 2 are oriented on the longitudinal direction. The inclined surface 111 of the hump portion 11 and the cushion 6 opposed thereto are on the front side (see FIG. 6). With this, when a cornering force acts on the bushing, it can exhibit a satisfactory toe correcting function.

The operation of the above-described embodiment will be now described. The operation of the embodiment is essentially the same as that having been described hereinbefore in terms of the general aspect of the invention. That is, bushings according to the present invention are attached to the link mechanism of the rear suspension system in right and left symmetry, as shown, for example, in FIG. 6. When the vehicle with such a link mechanism makes a traveling motion as shown by an arrow 23 in FIG. 6, the rear suspension system of the vehicle will exhibit a under-steer characteristic due to the aforementioned operation of the bushings.

An example of the operation will be described with reference to FIG. 6. In FIG. 6, the vehicle moves in the direction indicated by the arrow 23, and a cornering force F will act on the outer wheel. The force F is transmitted through the link mechanism to the outer tube 3. The force F transmitted to the outer tube 3 causes a component force P to be produced in a radial direction of the right-hand bushing, or the direction of arrow P, by the interaction between the tapered surface 31 and the inclined surface 111. In other words, the component force P arises with respect to the cornering force F.

On the other hand, for the inner wheel 9', a thrust force F' resulting from the same cornering force acts on the outer tube 3' of the left-hand bushing. A component force P' is divided from the force F' in a radial direction, or the direction of an arrow P', by the interaction between the tapered surface 31' and the tapered flange 51'. That is, the radial component force P' occurs with respect to the lateral force F'. As a result of these forces P and P', a force or moment guiding the wheels 9 and 9' to the toe-in side acts on the suspension mechanism or rear suspension system. This means that, in the rear suspension system to which the bushings of this embodiment have been attached, an under-steer phenomenon is caused by roll steer at the time of the traveling motion or cornering of the vehicle. With such a phenomenon, the stability and controllability during cornering is improved.

In the bushing of this embodiment, cavity portions 22, 22' are provided in the vibration isolating rubber 2 as shown in FIGS. 3 and 4a. The cavity portions 22, 22' are disposed so as to be on the longitudinal direction of the vehicle when the bushing is assembled in the suspension system. Therefore, the spring constant in the longitudinal direction is soft with respect to a traveling motion of the vehicle. That is, the compliance characteristic in the longitudinal direction is raised to thereby improve riding comfort when the vehicle rides across small bumps on the road. Thus, both riding comfort and steering stability of the vehicle can be enhanced using the bushing according to this embodiment, particularly, by using the bushings in the link mechanism of the rear suspension system.

Figure 8:
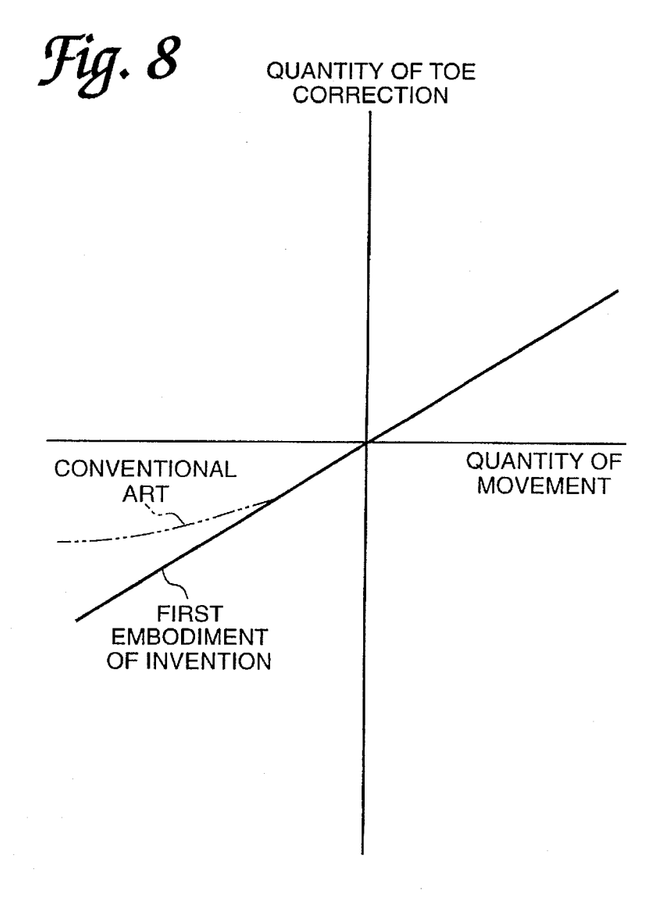
FIG. 8 is a diagram showing a toe correction state of the suspension mechanism using the bushing of FIG. 1, during roll steer.

The bushing of the embodiment has the structure in which the stopper 5 for a thrust load or force is provided separately, and the cushion 6 made from the resilient elastic material is provided between the tapered flange 51 and the tapered surface 31. As a result, the deformation or amount of deflection against a thrust force between the inner and outer tubes can be made symmetrical with respect to the lateral direction. Accordingly, when the bushings of such construction are attached to the respective link mounting portions corresponding to the left and right wheels 9 and 9', the moments tending to move the wheels 9 and 9' to the toe-in side, caused by the cornering force, will occur equally in the left and right wheels 9 and 9'. In other words, the toe correcting operation of the wheels 9 and 9' is a linear relationship, as shown in FIG. 8. Therefore, the under-steer characteristics during roll steer are high, compared with conventional bushings. Accordingly, steering stability is further enhanced.

Figure 7:
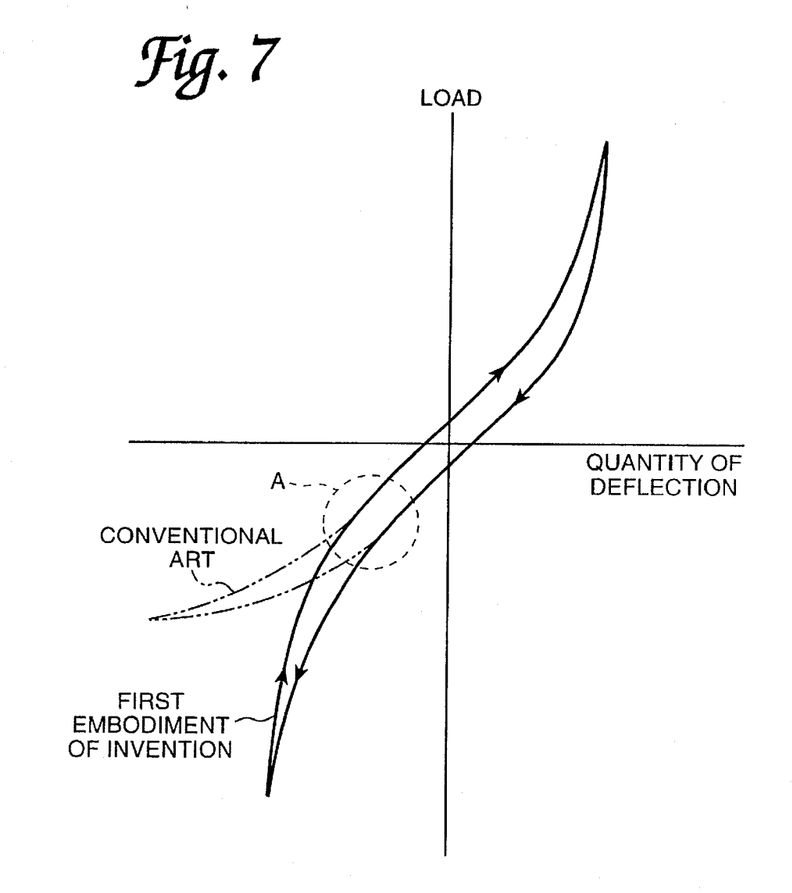
FIG. 7 is a diagram showing the load-deflection characteristics of the bushing of FIG. 1.
Figure 13:
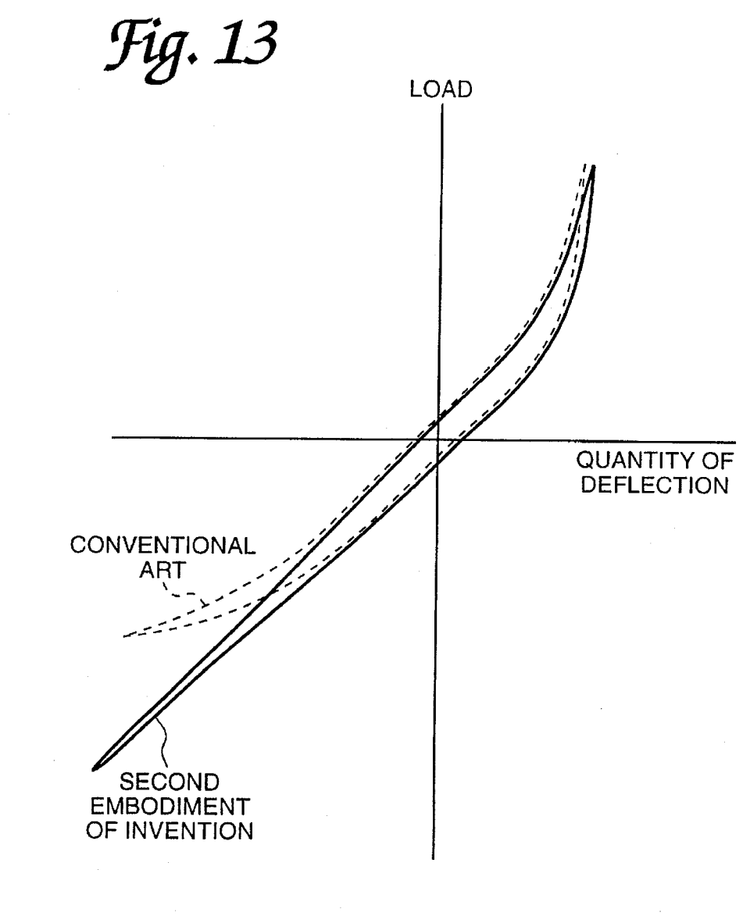
FIG. 13 is a diagram showing the load-deflection characteristic of the bushing of FIG. 10.

In addition, with the action of the stopper 5, the deformation or displacement of the bushing, with respect to a thrust input thereto, is stopped at a point of a certain fixed stroke along the right and left direction, as shown by "A" in FIG. 7. For this reason, an input load or force applied to the vibration isolating rubber 2, which is interposed between the inner and outer tubes 1 and 3, is suppressed at a fixed value. Accordingly, the durability of the bushing can be improved while maintaining a soft spring constant of the vibration isolating element 2 soft. Incidentally, the conventional art curve indicated in FIG. 7 (as a broken line) represents a bearing element with oblique portions only at one end, according to GB 2 033 533 A, referenced above. This can be said also of the conventional art curves shown in FIGS. 8, 13 and 14 as broken lines.

A vibration insulating bushing according to another embodiment of the invention will be now described with reference to FIGS. 10 to 14.

Figure 10:
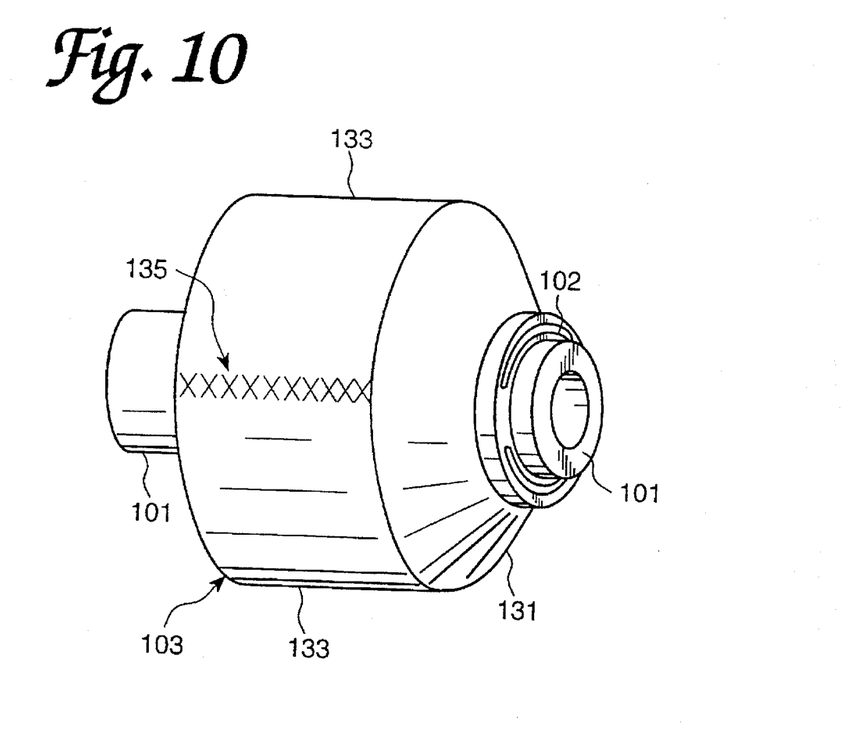
FIG. 10 is a perspective view showing the overall structure of a vibration isolating bushing according to another embodiment of the invention.

The bushing of the second embodiment, similar to the aforementioned embodiment, comprises an inner tube 101, an outer tube 103 coaxially surrounding the inner tube, and a vibration isolating element 102 which is integral with the inner and outer tubes. The bushing, however, differs from the aforementioned embodiment in a stopper is not provided. Also, the cross section of the outer tube is not a circle. The inner tube 101, the outer tube 103, and the vibration isolating element 102, therefore, differ slightly in shape from their counterparts in the first embodiment, but the basic structure is the same, and only differences will be described hereinafter.

The inner tube 101 is in the form of a generally straight pipe. A hump portion 1011 is provided on a part of its outer periphery. The hump portion 1011, as seen from FIG. 11, differs in size from the hump portion 11 of the first embodiment because of the configuration of the outer tube 103, but it is provided with an inclined surface 1111 (see FIG. 12). The spreading angle ($\theta$) of the hump portion 1011 and the angle of inclination of the inclined surface 1111 are the same as those of the first embodiment.

The cross-section of outer tube 103 is in the form of an ellipse with major axis 133 and minor axis 135. A tapered surface 131 is provided on one side thereof. The tapered surface 131 is substantially identical in its angle of inclination to the inclined surface 1111 of the inner tube 101, and opposes the inclined surface 1111 when the outer and inner tubes 103 and 101 are assembled. The outer tube 103 and the inner tube 101 are assembled with the hump portion 1011 of the inner tube 101 being disposed along the direction of the major axis 133 of the outer tube 101.

Figure 11:
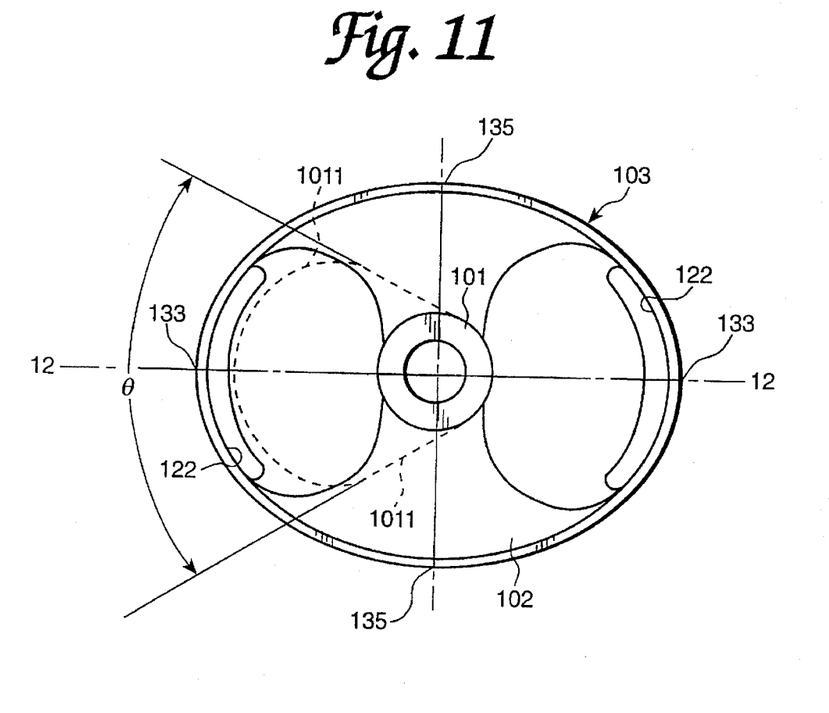
FIG. 11 is an end view showing an inner tube, an outer tube, and a vibration isolating element of the bushing of FIG. 10.
Figure 12:
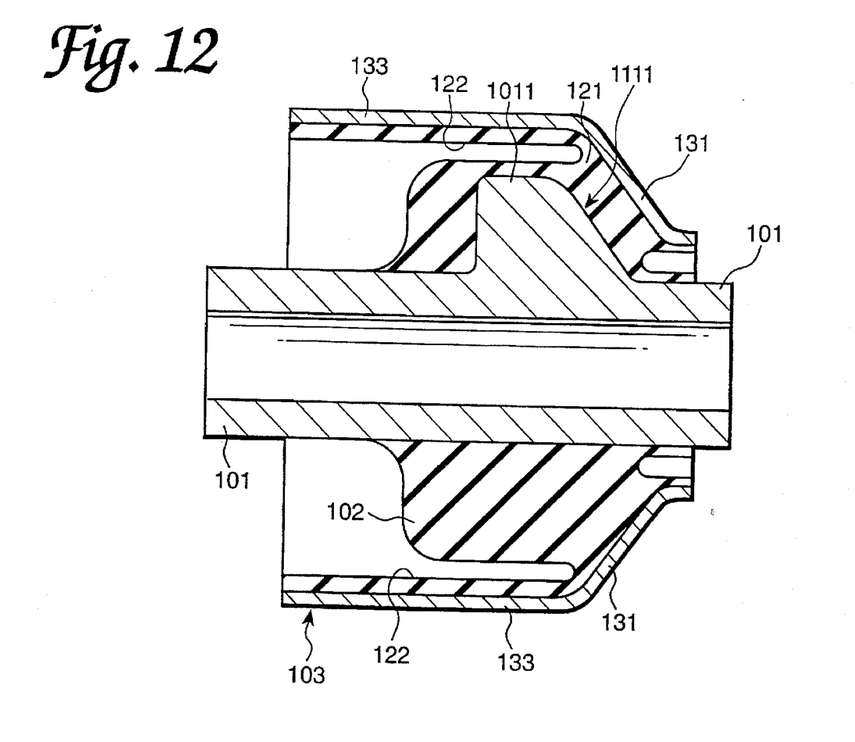
FIG. 12 is a sectional view taken along line 12—12 of FIG. 11.

The vibration isolating element 102, as in the first embodiment, is provided between the inner and outer tubes 101 and 103. The vibration isolating element 102 is made from a rubber material, for example, and forms an inclined portion 121 between the inclined surface 1111 of the inner tube 101 and the tapered surface 131 of the outer tube 103. The vibration isolating element 102 includes two hollow or cavity portions 122 in the form of an arc (seen in cross-section), which are arranged symmetrically along the outer tube 103 (see, for example, FIG. 11). As shown in FIG. 11, the cavity portions 122 are preferably provided only on the line 12—12, which is the major axis 133 of the outer tube 103. With such an arrangement, the vibration isolating element 102 substantially solid at the portion along minor axis 135 of the bushing. When the bushing is mounted on a suspension mechanism, the major axis 133 is oriented in the front-and-rear or longitudinal direction of a vehicle, and the minor axis 135 is oriented in the up-and-down or vertical direction. The inner tube 101, the outer tube 103, and the vibration isolating element 102 are integrally joined when the vibration isolating element 102 is, for example, vulcanized and adhered.

The bushing according to this embodiment is mounted on the vehicle so that the major axis 133 sides of the outer tube 103 and the cavity portions 122 of the vibration isolating element 102 are oriented in the longitudinal direction and that the inclined surface 1111 of the hump portion 1011 is on the front side. Thus, the major axis sides of the outer tube 103 face along the longitudinal direction of the vehicle when the bushing is mounted. This makes it possible to provide a sufficient volume for the inclined portion 121. The minor axis sides of the outer tube 103, on the other hand, face along the vertical direction of the vehicle. This makes it possible to provide, without requiring a large space in the vertical direction, a sufficient volume for the vibration isolating element 102. The bushing therefore exhibits an adequate toe correcting function when a cornering force acts thereon.

In the application of the second embodiment to the vehicle, as with the first embodiment, a pair of bushings are attached, for example, to the link mechanism of a rear suspension system, in right-and-left symmetry, with the respective inclined surfaces of the hump portions oriented outside. When the vehicle makes a corner, a weak understeer phenomenon due to roll steer is caused by the action of the bushings. Therefore, steering stability will be enhanced. The action of each bushing is almost the same as is in the case with the aforementioned first embodiment. Because a stopper is not provided, however, producing a component force in the bushing on the inner side of the cornering is maneuver entirely dependent on the tensile action of the inclined portion 121 interposed between the tapered surface 131 and the inclined surface 1111.

Even in this embodiment, as with the first embodiment, the cavity portions.122 are provided on the major axis of the bushing, and the major axis is substantially aligned with the longitudinal direction of the vehicle when the bushing is mounted thereon. As a result, the spring constant in the longitudinal direction is soft with respect to the motion of the vehicle. That is, the compliance characteristic in the longitudinal direction is enhanced, thereby improving riding comfort when the vehicle runs over small bumps or jogs in the road. Both riding comfort and steering stability of the vehicle can be enhanced by using the bushing of the second embodiment in a suspension mechanism, particularly, in the link mechanism of a rear suspension system.

Figure 14:
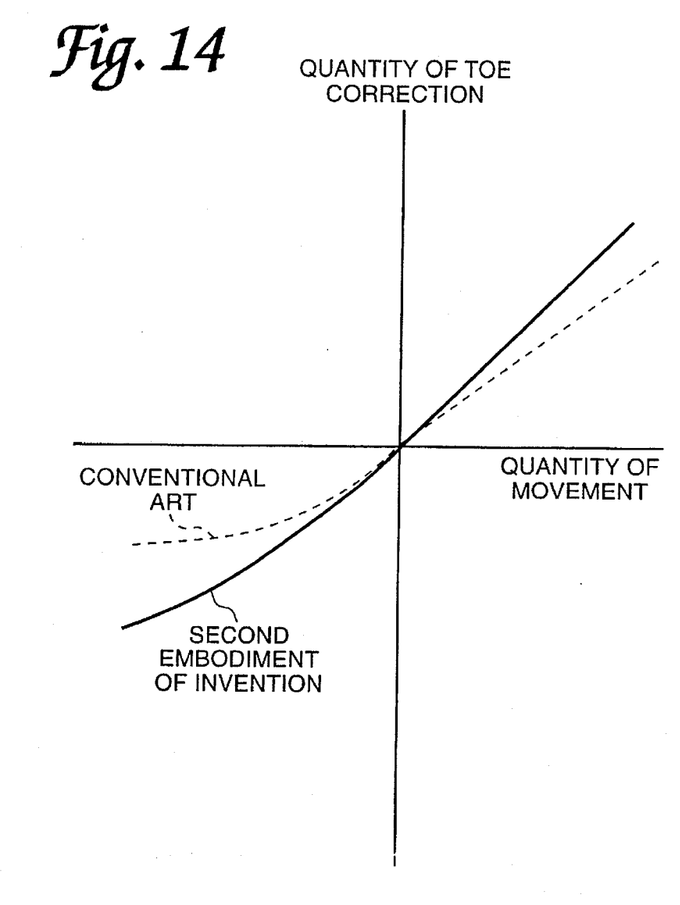
FIG. 14 is a diagram showing the toe correction state of a suspension mechanism using the bushing of FIG. 10, which is obtained during roll steer.

Moreover, in the second embodiment, the portion which is subjected to a thrust force, i.e., the inclined portion 121 has a comparatively large quantity of constituent rubber, because the outer tube 103 is in the form of an ellipse and also because the inclined surface 1111 of the hump portion of the inner tube is substantially aligned with the major axis 133 side of the outer tube. With this structure, the occurrence of a radial component force with respect to the thrust force in the direction of tension, which acts on the bushing on the inner side of cornering, becomes substantially the same as the occurrence of a component force with respect to the thrust force in the direction of compression (see FIG. 13). Accordingly, moments, which tend to move respective wheels to the toe-in side, against the cornering force, occur in the right and left wheels in a similar manner. That is, the toe correction of the right and left wheels occurs in a comparatively linear manner, as shown in FIG. 14. As a result; the under-steer characteristic at the time of roll steer becomes strong as compared with conventional bushings, and steering stability is further enhanced.

While the invention has been described with reference to the embodiments thereof, it is to be appreciated that the invention is not limited solely to the specific forms and various changes and modification may be made without departing from the scope of the appended claims.

What is claimed is:

1. A bushing for a vehicle suspension system, comprising:
   an inner ube having a hump portion formed on a part of an outer periphery thereof, said hump portion projecting in a radial direction of said inner tube in a fan shape, said hump portion having a radially extending surface which is inclined relative to an axis of said inner tube;
   an outer tube coaxially surrounding said inner tube, said outer tube having tapered portion at an end thereof, said tapered portion having an inner surface opposing said inclined surface of said hump portion;
   a resilient vibration isolating element provided between said inner and outer tubes, said vibration isolating element being integrally joined to said inner and outer tubes;
   a disk-shaped stopper having an inclined flange portion, said stopper being connected to said inner tube with said flange portion facing an outer surface of said tapered portion of said outer tube; and
   a resilient cushion element fixedly secured to one of said outer surface of said tapered portion of said outer tube and said flange of said stopper opposed thereto, said cushion element positioned to be opposite said inclined surface of said inner tube, with said tapered portion of said outer tube interposed therebetween.

2. The bushing according to claim 1, wherein said vibration isolating element includes a plurality of hollow portions which are spaced from one another along a circumferential direction, each said hollow portion having an arcuate cross-sectional shape extending along an inner circumference of said outer tube.

3. The bushing according to claim 1, wherein said cushion element has a surface portion facing the other of said outer surface of said tapered portion and said flange of said stopper, wherein a plurality of grooves are formed in said surface portion, each of said grooves extending along a circumferential direction of said stopper.

4. The bushing according to claim 2, wherein at least two said hollow portions are substantially symmetrically provided in said vibration isolating element, and said hump portion is substantially aligned with one of said at least two hollow portions.

5. The bushing according to claim 4, wherein a cross section of said outer tube is elliptical, and said hump portion is substantially aligned with a major axis of said elliptical cross section of said outer tube.

6. A bushing for a vehicle suspension system, comprising:
   an inner tube having a hump portion formed on a part of an outer periphery thereof, said hump portion projecting in a radial direction of said inner tube into a fan shape, said hump portion having a radially extending surface which is inclined relative to an axis of said inner tube;
   an outer tube coaxially surrounding said inner tube, said outer tube being elliptical in cross section and having a tapered portion at an end thereof, said tapered portion facing said inclined surface of said inner tube;
   said hump portion being substantially aligned with a major axis of said elliptical cross section of said outer tube; and
   a resilient vibration isolating element provided between said inner and outer tubes, said vibration isolating element being integrally joined to said inner and outer tubes and including at least two hollow portions, said hollow portions being symmetrically positioned with respect to said inner tube so that said hollow portions are substantially aligned with said major axis of said elliptical cross section of said outer tube, each of said hollow portions being in an arcuate shape, along an inner circumference of said outer tube.

* * * * *